United States Patent
Ito

(10) Patent No.: US 9,871,947 B2
(45) Date of Patent: Jan. 16, 2018

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Naoki Ito, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/211,914

(22) Filed: Jul. 15, 2016

(65) Prior Publication Data
US 2017/0026546 A1  Jan. 26, 2017

(30) Foreign Application Priority Data

Jul. 21, 2015 (JP) .................................. 2015-144409

(51) Int. Cl.
  *G06F 15/00* (2006.01)
  *H04N 1/387* (2006.01)
  *H04N 1/00* (2006.01)

(52) U.S. Cl.
  CPC ......... *H04N 1/387* (2013.01); *H04N 1/00037* (2013.01); *H04N 2201/0094* (2013.01)

(58) Field of Classification Search
  CPC .......... H04N 1/387; H04N 2201/0094; H04N 1/00037
  See application file for complete search history.

(56) References Cited

U.S. PATENT DOCUMENTS

| | | | |
|---|---|---|---|
| 7,129,947 B1 * | 10/2006 | Schroeder | G06T 17/20 345/428 |
| 2002/0149808 A1 | 10/2002 | Pilu | |
| 2012/0087561 A1 | 4/2012 | Guetter | |
| 2012/0263394 A1 * | 10/2012 | Fujiwara | H04N 1/387 382/266 |
| 2013/0094764 A1 | 4/2013 | Campbell | |
| 2013/0121595 A1 | 5/2013 | Kawatani | |
| 2014/0268247 A1 * | 9/2014 | Sakaida | H04N 1/387 358/406 |

FOREIGN PATENT DOCUMENTS

| | | |
|---|---|---|
| EP | 2388735 A2 | 11/2011 |
| JP | 2007-52670 A | 3/2007 |
| WO | 2009/157946 A1 | 12/2009 |
| WO | 2011/163414 A2 | 12/2011 |
| WO | 2014/049368 A1 | 4/2014 |

* cited by examiner

*Primary Examiner* — Saeid Ebrahimi Dehkordy
(74) *Attorney, Agent, or Firm* — Canon U.S.A., Inc. IP Division

(57) ABSTRACT

An image processing apparatus includes an acquisition unit configured to acquire a plurality of images including a first image, a detection unit configured to detect a quadrilateral region from the first image included in the plurality of images acquired by the acquisition unit, a determination unit configured to determine a position of each edge that constitutes the quadrilateral region detected by the detection unit, and a reflection unit configured to reflect, to the plurality of images other than the first image, information about the position of each edge which has been determined by the determination unit to the first image, in a case where the detection unit detects a quadrilateral region included in each of the plurality of images other than the first image acquired by the acquisition unit.

21 Claims, 14 Drawing Sheets

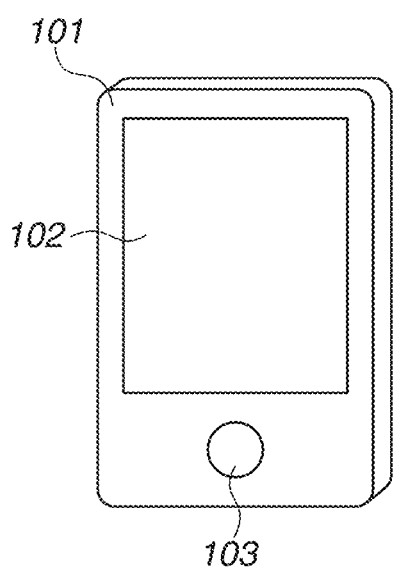
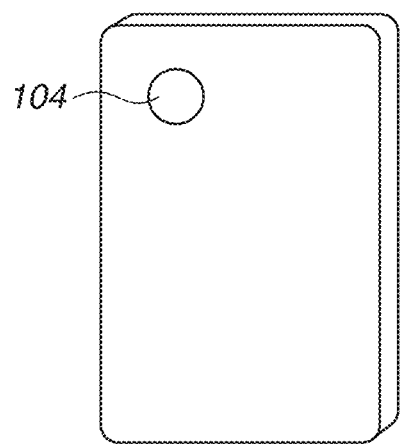
FIG.1A
FIG.1B

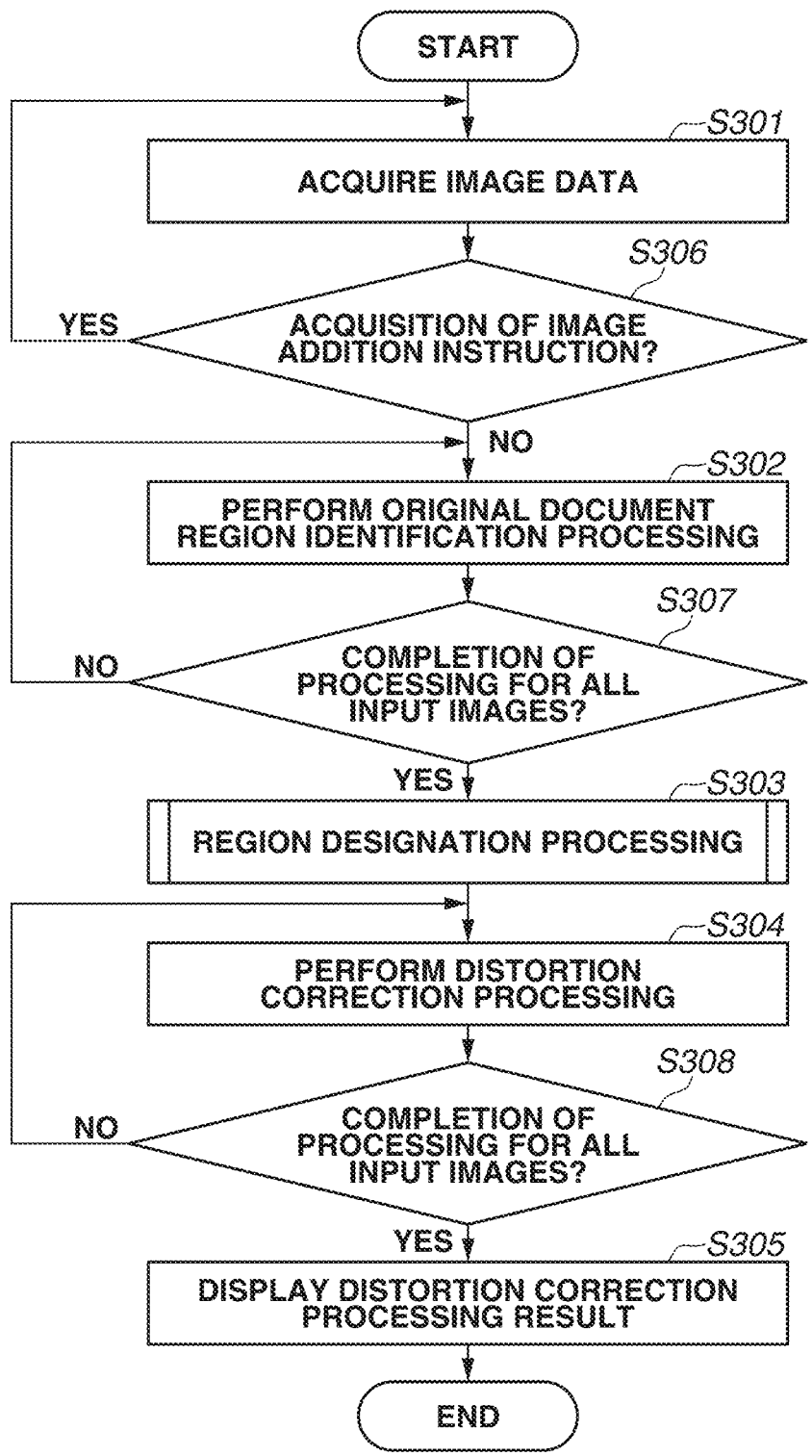

FIG.9A

| RANK | UPPER EDGE | | | | RIGHT EDGE | | | | LOWER EDGE | | | | LEFT EDGE | | | |
|---|---|---|---|---|---|---|---|---|---|---|---|---|---|---|---|---|
| | X1 | Y1 | X2 | Y2 | X1 | Y1 | X2 | Y2 | X1 | Y1 | X2 | Y2 | X1 | Y1 | X2 | Y2 |
| 1 | 140 | 80 | 2200 | 90 | 2250 | 85 | 2240 | 3200 | 150 | 3180 | 2230 | 3190 | 130 | 70 | 2190 | 100 |
| 2 | 130 | 90 | 2350 | 100 | 2300 | 90 | 2350 | 3230 | 140 | 3220 | 2360 | 3240 | 140 | 100 | 2400 | 90 |
| 3 | 100 | 30 | 2250 | 50 | 2200 | 55 | 2180 | 3180 | 90 | 3150 | 2190 | 3200 | 110 | 40 | 2260 | 80 |
| 4 | 90 | 110 | 2150 | 100 | 2230 | 120 | 2200 | 3150 | 80 | 3100 | 2190 | 3140 | 100 | 100 | 2130 | 120 |
| 5 | 200 | 105 | 2100 | 90 | 2050 | 100 | 2100 | 3180 | 180 | 3200 | 2090 | 3170 | 210 | 125 | 2090 | 100 |
| 6 | 250 | 200 | 2300 | 150 | 2330 | 180 | 2300 | 3100 | 230 | 3130 | 2290 | 3300 | 260 | 220 | 2280 | 130 |
| · | · | · | · | · | · | · | · | · | · | · | · | · | · | · | · | · |
| · | · | · | · | · | · | · | · | · | · | · | · | · | · | · | · | · |

FIG.9B

| RANK | UPPER EDGE | | | | RIGHT EDGE | | | | LOWER EDGE | | | | LEFT EDGE | | | |
|---|---|---|---|---|---|---|---|---|---|---|---|---|---|---|---|---|
| | X1 | Y1 | X2 | Y2 | X1 | Y1 | X2 | Y2 | X1 | Y1 | X2 | Y2 | X1 | Y1 | X2 | Y2 |
| 1 | 100 | 30 | 2250 | 50 | 2200 | 55 | 2180 | 3180 | 90 | 3150 | 2190 | 3200 | 110 | 40 | 2260 | 80 |
| 2 | 130 | 90 | 2350 | 100 | 2300 | 90 | 2350 | 3230 | 140 | 3220 | 2360 | 3240 | 140 | 100 | 2400 | 90 |
| 3 | 140 | 80 | 2200 | 90 | 2250 | 85 | 2240 | 3200 | 150 | 3180 | 2230 | 3190 | 130 | 70 | 2190 | 100 |
| 4 | 250 | 200 | 2300 | 150 | 2330 | 180 | 2300 | 3100 | 230 | 3130 | 2290 | 3300 | 260 | 220 | 2280 | 130 |
| 5 | 200 | 105 | 2100 | 90 | 2050 | 100 | 2100 | 3180 | 180 | 3200 | 2090 | 3170 | 210 | 125 | 2090 | 100 |
| 6 | 90 | 110 | 2150 | 100 | 2230 | 120 | 2200 | 3150 | 80 | 3100 | 2190 | 3140 | 100 | 100 | 2130 | 120 |
| · | · | · | · | · | · | · | · | · | · | · | · | · | · | · | · | · |
| · | · | · | · | · | · | · | · | · | · | · | · | · | · | · | · | · |

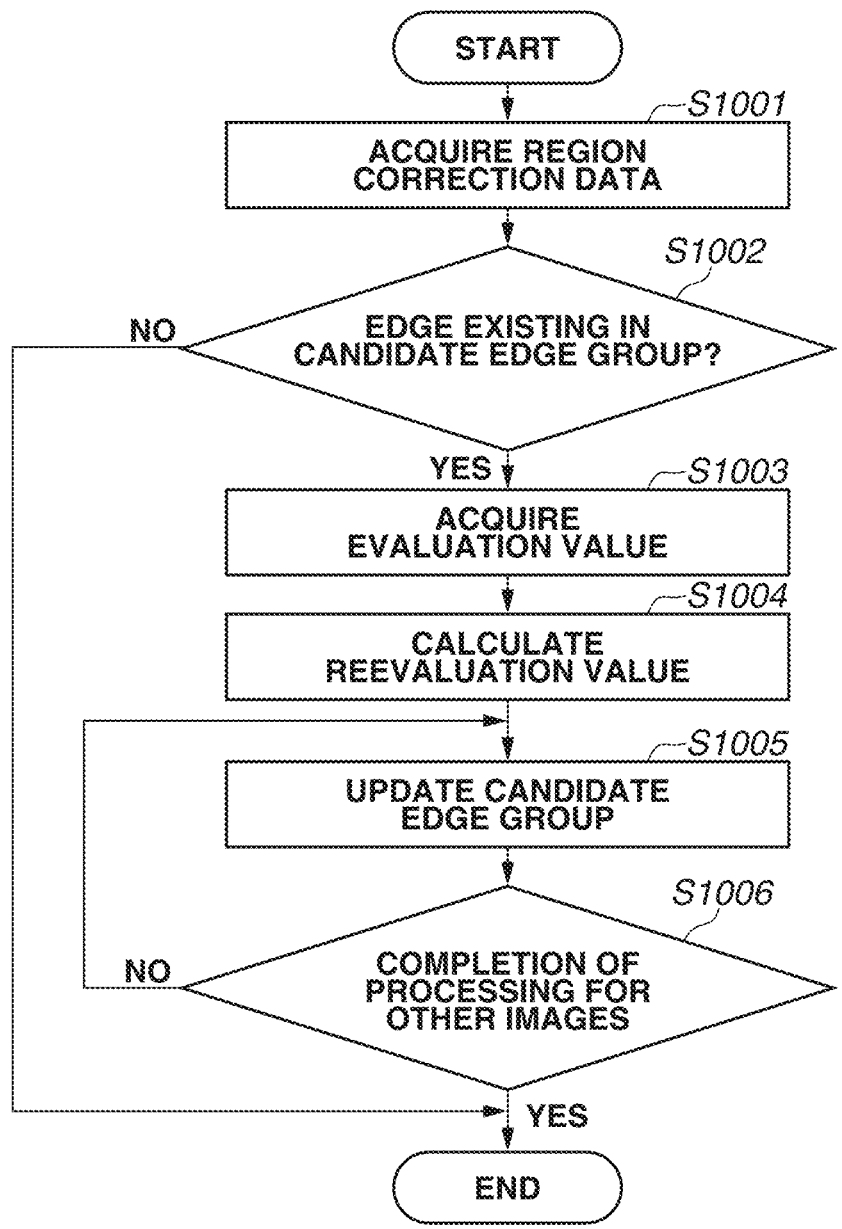

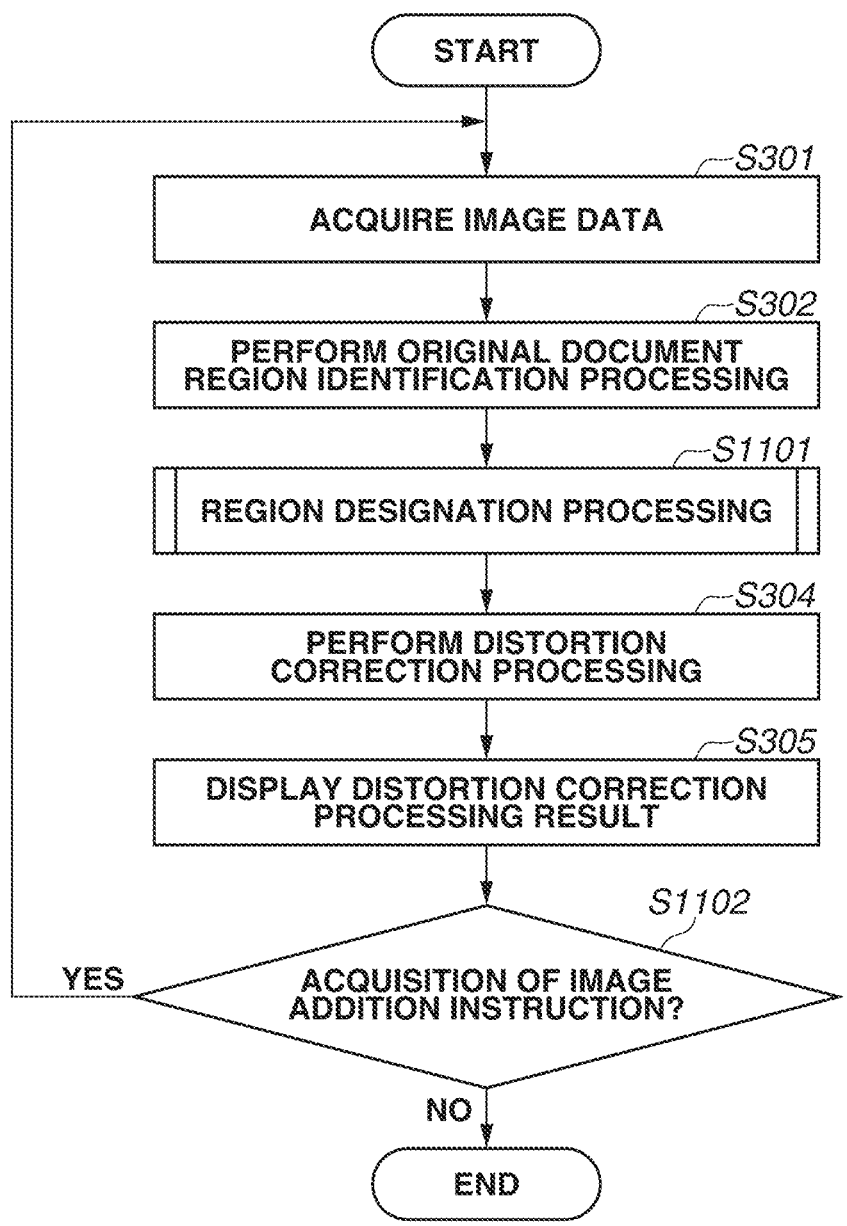

IMAGE PROCESSING APPARATUS, IMAGE PROCESSING METHOD, AND STORAGE MEDIUM

BACKGROUND OF THE INVENTION

Field of the Invention

The present disclosure generally relates to image processing and, more particularly, to an image processing apparatus, an image processing method, and a storage medium that can extract an original document region included in an image and can correct a distortion of the extracted region. The present disclosure further relates to a related image processing method and a storage medium.

Description of the Related Art

Portable terminals, such as recent smartphones and tablet personal computers (PCs), having highly advanced image processing functions become popular. Such a portable terminal is equipped with a camera having an image capturing function (i.e., a camera function). The camera function of such a portable terminal is available to capture an image of, for example, a paper document. The captured document image (i.e., image data) can be stored in a memory of the portable terminal. Further, it is feasible to transmit the captured image data to a printer and cause the printer to perform a printing operation. In other words, the portable terminal can be combined or associated with a printer to copy a target object. Even in a situation where a user does not have a multi function peripheral (MFP), i.e., an image processing apparatus having both a scanner function and a printer function, it is feasible to copy an original document when both the portable terminal and the printer are available as mentioned above.

In a document image capturing operation performed with a portable terminal using the above-mentioned camera function, it is usually difficult to capture a front image of the entire document without causing any distortion in the captured entire image, compared to the case where the document is scanned by the MFP. Therefore, it is necessary to prepare a pedestal or a tripod to fix the portable terminal and the original document (i.e., a photographing target). Otherwise, accurately maintaining the distance or the angle between the camera and the original document is difficult. Further, directly copying the thus captured image or storing a data file of the thus captured image is not desirable because a photographed image may include a noise component other than the original document image or the document image may be geometrically deformed, for example, when the image has been captured in an oblique direction. In such a case, it is necessary to extract only an original document image region (i.e., i.e., an original document region) from the captured image before performing the copy operation or storing the data file, and remove geometrical distortions by applying a distortion correction (which may be referred to as "trapezoidal correction") to the extracted document region.

As a method for extracting an original document region from a captured image, there is a conventional method for automatically detecting four edges of the original document region (i.e., edges respectively constituting end portions of an original document) with reference to edge information obtained from the captured image so that the burden of a user can be reduced. However, the automatic detection of the edges constituting the original document region may be failed, for example, if an intended edge of the original document region cannot be detected due to a lower contrast between the original document region and a background region surrounding the original document, or if many edges other than the four edges of the original document region are detected and the intended edge cannot be appropriately determined.

In this case, the method includes identifying a quadrilateral constituted by line segments, which are determined as being possibly the edges of the original document region, from an assembly of line segments detected as the edges of the original document region, and superimposing the identified quadrilateral on an input image. The method includes accepting a user operation to correct the positions of the four edges because it is necessary to designate an accurate original document region.

Further, as a method for enabling a user to designate a quadrilateral region, it is conventionally known to set vertices of a quadrilateral and correction handles positioned at midpoints of respective edges and accept a mouse or touch operation performed by the user. According to the above-mentioned method, the user can move a vertex or an edge to an arbitrary position by operating the corresponding handle.

Further, there is a conventional method for enabling a user to select the position of a desired vertex or edge from candidates having been acquired beforehand instead of directly designating the vertex position or the edge position. As discussed in Japanese Patent Application Laid-Open No. 2007-52670, it is conventionally known to obtain a plurality of contour candidates and enable a user to select and designate a desired contour candidate from the sequentially presented contour candidates.

However, according to the above-mentioned technique, when a user inputs a plurality of images and performs a correction operation for an original document image included in each image, it is necessary for the user to perform an operation to correct the positions of four edges of original document images included in respective images.

Therefore, it is necessary for a user to perform processing for designating an accurate region for each original document image included in the plurality of images. The correction operation requires a significant amount of work and becomes complicated.

SUMMARY OF THE INVENTION

According to an aspect of the present disclosure, an image processing apparatus includes an acquisition unit configured to acquire a plurality of images including a first image, a detection unit configured to detect a quadrilateral region from the first image included in the plurality of images acquired by the acquisition unit, a determination unit configured to determine a position of each edge that constitutes the quadrilateral region detected by the detection unit, and a reflection unit configured to reflect, to the plurality of images other than the first image, information about the position of each edge which has been determined by the determination unit to the first image, in a case where the detection unit detects a quadrilateral region included in each of the plurality of images other than the first image acquired by the acquisition unit.

Therefore, by correcting the positions of four edges that constitute an original document image (i.e., a quadrilateral image) included in one of a plurality of input images, it becomes feasible to correct detection results of original document images included in the plurality of input images other than the one of the plurality of input images. Thus, it becomes feasible to reduce the correction operation required to be performed to four edges that constitute an original document image included in each of the plurality of input images other than the one of the plurality of input images. The user operation therefore can be simplified.

Further features of the present disclosure will become apparent from the following description of exemplary embodiments with reference to the attached drawings.

BRIEF DESCRIPTION OF THE DRAWINGS

FIGS. 1A and 1B are schematic views illustrating a portable terminal according to a first exemplary embodiment.

FIG. 3 is a flowchart illustrating a processing procedure according to the first exemplary embodiment.

FIGS. 9A and 9B are diagrams illustrating candidate line segment group management tables, each storing candidate line segment groups, according to the first exemplary embodiment.

FIG. 10 is a flowchart illustrating a candidate edge group update processing procedure according to the first exemplary embodiment.

FIG. 11 is a flowchart illustrating a processing procedure according to a second exemplary embodiment.

DESCRIPTION OF THE EMBODIMENTS

Hereinafter, exemplary embodiments of the disclosure will be described in detail below with reference to attached drawings.

<Configuration of Portable Terminal>

FIGS. 1A and 1B illustrate appearances of a portable terminal (i.e., an image processing apparatus) 101 according to a first exemplary embodiment. FIG. 1A illustrates an appearance of the portable terminal 101 seen from a front side thereof. A touch panel display device 102 and an operation button 103 are provided on the front side of the portable terminal 101. FIG. 1B illustrates an appearance of the portable terminal 101 seen from a rear side thereof. A camera 104 is provided on the rear side of the portable terminal 101. Further, the camera 104 includes an automatic focusing mechanism (not illustrated), which can measure a focal length or a subject distance.

The present disclosure is applicable to various image processing apparatuses that have the above-mentioned camera function. For example, the image processing apparatus is a smartphone (or a portable telephone), a tablet terminal, or a personal computer (PC), each having the camera function. Further, the image processing apparatus can be a digital camera equipped with a touch panel display device. Further, the image processing apparatus can be a personal computer connected to a camera via a wired or wireless network. Further, when a portable terminal or a PC is accessible to a storage device (e.g., a memory card) that stores image data captured by a camera or the like, the portable terminal or the PC can read image data from the storage device and perform processing according to the present exemplary embodiment.

Figure 2:
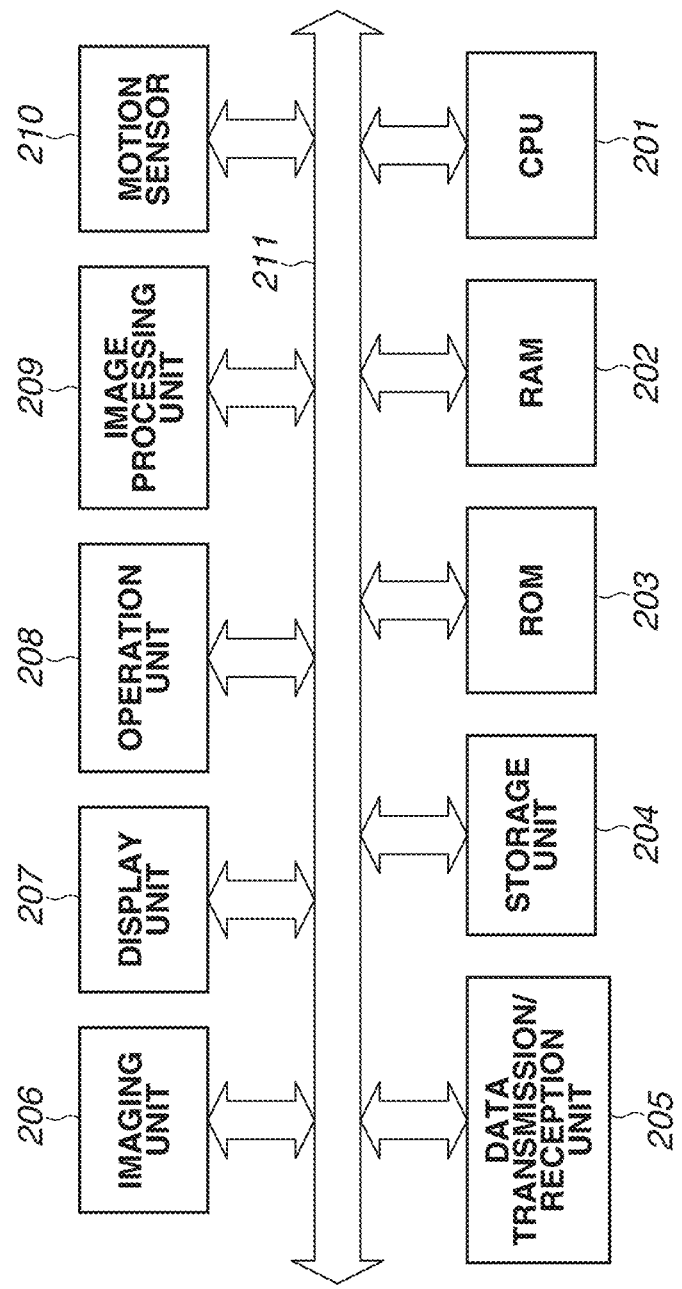
FIG. 2 is a block diagram illustrating a schematic configuration of the portable terminal according to the first exemplary embodiment.

FIG. 2 illustrates an internal configuration of the portable terminal 101. The configuration illustrated in FIG. 2 is an example according to the present exemplary embodiment. The present disclosure is not limited to the illustrated configuration.

In FIG. 2, a central processing unit (CPU) 201, a random access memory (RAM) 202, and a read only memory (ROM) 203 can transmit and receive programs and data via a data bus 211. A storage unit 204, a data transmission/reception unit 205, an imaging unit 206, a display unit 207, an operation unit 208, an image processing unit 209, and a motion sensor 210 are connected to the data bus 211. The above-mentioned functional units are associated with the CPU 201, the RAM 202, and the ROM 203 to transmit and receive programs and data. As used herein, the term "unit" generally refers to any combination of software, firmware, hardware, or other component, such as circuitry, that is used to effectuate a purpose.

The storage unit 204 is a flash memory, which can store image data and various programs. The data transmission/reception unit 205 includes a wireless local area network (LAN) controller, which can transmit and receive data to and from an external device.

The imaging unit 206 is a camera, which captures an image of an original document and acquires image data. The imaging unit 206 provides manufacturer name of the portable terminal and header information (e.g., model name, image resolution, aperture value (F value), and focal length) for the acquired image data and then transmits the image data to each unit as described below.

The display unit 207 is a display device, which displays various kinds of information, including a live-view display to be performed during an imaging operation of the imaging unit 206 and a processing end notification display according to the present exemplary embodiment. The operation unit 208 is a touch panel or an operation button, which accepts a user operation and transmits operational information to each unit.

The image processing unit 209 performs original document extraction processing for extracting an original document image (e.g., a quadrilateral region) from a captured image. The motion sensor 210 includes a triaxial acceleration sensor, an electronic compass, and a triaxial angular speed sensor. The motion sensor 210 detects the posture or a movement of the portable terminal 101 by using a conventionally known technique.

In the present exemplary embodiment, the CPU 201, which may include one or more processors and one or more memories, reads a computer program from the ROM 203 or the storage unit 204 and executes the computer program to control constituent components of the portable terminal 101.

Detailed Description of Processing According to the Present Exemplary Embodiment FIG. 3 is a flowchart illustrating distortion correction processing (which may be referred to as "trapezoidal correction processing") that is performed by the portable terminal 101 according to the present exemplary embodiment. The portable terminal 101 causes a user to designate a reference quadrilateral region to be subjected to the distortion correction processing in an input image stored in the ROM 203 or an input image acquired by the imaging unit 206. The portable terminal 101 performs the distortion correction processing for correcting the instructed quadrilateral region in such a manner that the corrected quadrilateral region becomes a rectangle. In the present exemplary embodiment, the CPU 201 (i.e., the computer) of the portable terminal 101 functionally operates as a processing unit that performs processing in each step of FIG. 3 by executing a related processing program loaded into the RAM 202 from the ROM 203.

In step S301, the CPU 201 acquires an input image selected or photographed by a user. In a case where the CPU 201 acquires an input image from the stored images, the CPU 201 selects the image instructed by the operation unit 208 from the images stored in the memory (e.g., the ROM 203 or a memory card) via the data bus 211. On the other hand, in a case where the CPU 201 acquires an input image by image capturing, the CPU 201 acquires the input image captured by the imaging unit 206 via the data bus 211.

In step S306, the CPU 201 causes the display unit 207 to display a content that enables the user to instruct selecting an additional image or photographing an additional image.

The CPU 201 acquires information about an operation via the operation unit 208 on the content displayed by the display unit 207. In the present exemplary embodiment, the information about the operation via the operation unit 208 is information instructing addition of a processing target image, selection of an image from the memory, causing the imaging unit to capture an image, or addition of no image.

In the case where the user selects an input image as an image to be added, the CPU 201 selects the image instructed by the operation unit 208 from the images stored in the ROM 203 or the memory card via the data bus 211, as described in the processing of step S301. Further, in the case where the user photographs an input image as an image to be added, the CPU 201 acquires the image acquired by the imaging unit 206 via the data bus 211, as described in the processing of step S301.

In step S302, the CPU 201 detects a candidate line segment group (i.e., a candidate edge group), as candidates for each edge of an original document region, from the input images acquired in step S301. Then, the CPU 201 performs original document region identification processing to identify a quadrilateral region that represents four edges of an original document region constituted by highly possible edges selected from the detected candidate line segment group (i.e., the plurality of line segments). The original document region identification processing will be described in detail below with reference to FIGS. 4A, 4B, and 4C. If there is an added image in step S306, the CPU 201 performs the original document region identification processing described in step S302 for each of the added images.

In step S307, the CPU 201 determines whether the processing in step S302 (i.e., the original document region identification processing) has been completed for all of the input images acquired in step S301.

In step S303, the CPU 201 performs region designation processing that includes superimposing the quadrilateral region detected in step S302 on the input image and changing (or correcting) the shape of the quadrilateral region in response to a user instruction input on the displayed quadrilateral region.

In the present exemplary embodiment, the initially corrected input image is referred to as a reference image (or a first image). The reference image is not limited the initially input image. An image initially subjected to the correction processing is referred to as the reference image.

The region designation processing will be described in detail below with reference to FIG. 5.

In step S304, the CPU 201 performs distortion correction processing that includes extracting a quadrilateral region image from the input image with reference to the quadrilateral region designated in step S303 and correcting distortions in such a way as to convert the extracted quadrilateral region image into a rectangular image. The distortion correction processing will be described in detail below.

In step S308, the CPU 201 determines whether the distortion correction processing in step S304 has been completed for all input images acquired in step S301.

In step S305, the CPU 201 causes the display unit 207 to display a preview image of the original document image subjected to the distortion correction processing in step S304. If there is a plurality of original document images each having been subjected to the distortion correction processing in step S304, the CPU 201 causes the display unit 207 to display preview images of all original document images. In this case, the way of displaying the preview images is not limited to a specific method. For example, the CPU 201 causes the display unit 207 to display a plurality of reduced preview images simultaneously on the display unit 207. As another method, the CPU 201 causes the display unit 207 to display a preview image independently for each original document image.

Although the above-mentioned processing (including the image acquisition to the trapezoidal correction) has been performed by the portable terminal 101, the MFP can perform similar processing. More specifically, the MFP can scan an image and display a scanned image on a user interface (UI) of the MFP, and can perform trapezoidal correction processing.

<Detailed Description of Original Document Region Identification Processing (to be Performed in Step S302)>

Figure 4A:
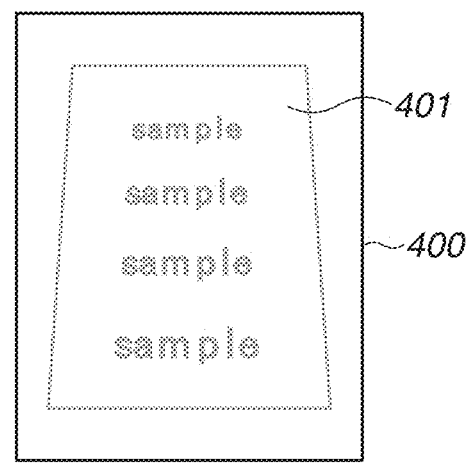
FIGS. 4A, 4B, and 4C are diagrams illustrating original document region identification processing according to the first exemplary embodiment.

The original document region identification processing (i.e., the processing to be performed in step S302) is performed by the image processing unit 209. When the acquisition of an input image is completed, the image processing unit 209 identifies a candidate line segment group including candidates of four edges for an original document region and a quadrilateral region indicating four edges of the original document region. FIG. 4A illustrates an input image 400, which includes an original document region 401 that indicates the quadrilateral region of an original document image.

Figure 4B:
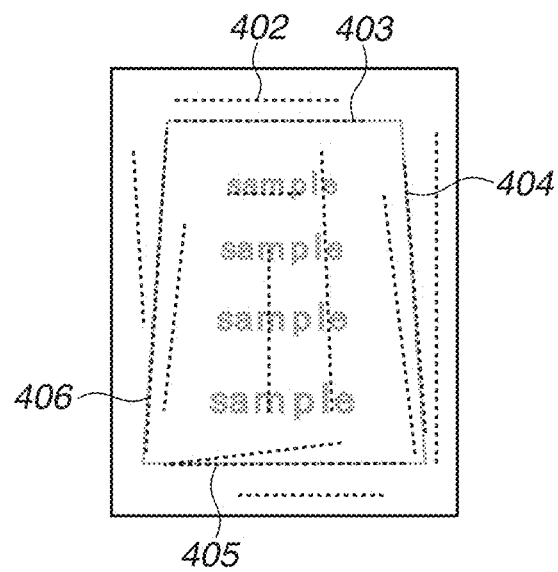

FIG. 4B illustrates an image including the candidate line segment group superimposed on the input image 400. The candidate line segment group can be obtained by using a conventionally-known method (e.g., Hough transformation algorithm) that detects edge information from the input image 400. The detected candidate line segment group includes surplus candidate line segments (e.g., including a line segment 402) other than the four edges constituting the original document region. The image processing unit 209 identifies highly possible candidate line segments 403, 404, 405, and 406 that possibly constitute an upper edge, a right edge, a lower edge, and a left edge of the original document region. As an exemplary method for identifying the candidate line segments 403, 404, 405, and 406, as first candidates, from the candidate line segment group, the image processing unit 209 evaluates each quadrilateral constituted by four arbitrary candidate line segments. More specifically, the image processing unit 209 can evaluate each quadrilateral constituted by four arbitrary candidate line segments based on geometrical information (e.g., length ratio of opposite edges, interior angles, and aspect ratio). Further, the image processing unit 209 can refer to image information (e.g., differences in tint or dispersion between an interior portion and an exterior portion) to identify the line segments that constitute a quadrilateral.

Figure 4C:
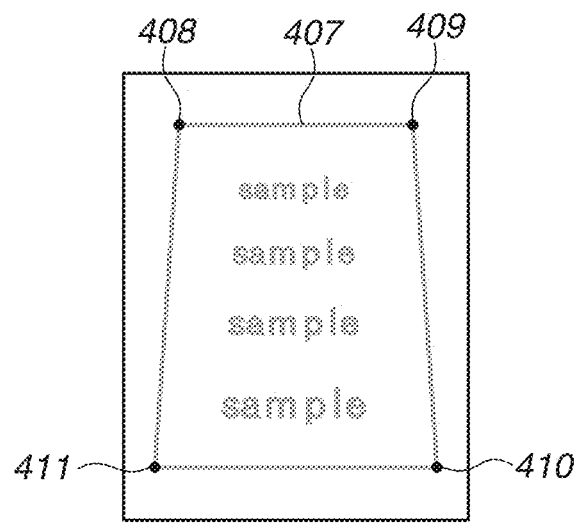

FIG. 4C illustrates an image including a quadrilateral region 407, which is the original document region identified from the candidate line segment group and superimposed on the displayed input image 400. The quadrilateral region 407 is a quadrilateral region that can be constituted when the candidate line segments 403, 404, 405, and 406 are identified as four edges, or a quadrilateral region surrounded by line segments connecting vertex 408, 409, 410, and 411.

FIG. 9A illustrates an example of a candidate line segment group management table, which stores information about candidate line segment groups. According to the illustrated example, first-ranked to sixth-ranked line segment groups are stored in the table, as information representing highly possible edges that constitute a quadrilateral region. The candidate line segment group management table stores coordinate information about left end (X1, Y1) and right end (X2, Y2) of the upper edge, coordinate information about upper end (X1, Y1) and lower end (X2, Y2) of the right edge, coordinate information about left end (X1, Y1) and right end (X2, Y2) of the lower edge, and coordinate information about upper end (X1, Y1) and lower end (X2, Y2) of the left edge, which cooperatively constitute respective edges of the quadrilateral region.

<Detailed Description of Region Designation Processing (to be Performed in Step S303)>

In the region designation processing to be performed in step S303, the reference quadrilateral region to be subjected to the distortion correction processing is modified (or corrected) based on a user designation. The region designation processing will be described in detail below with reference to a flowchart illustrated in FIG. 5.

Figure 5:
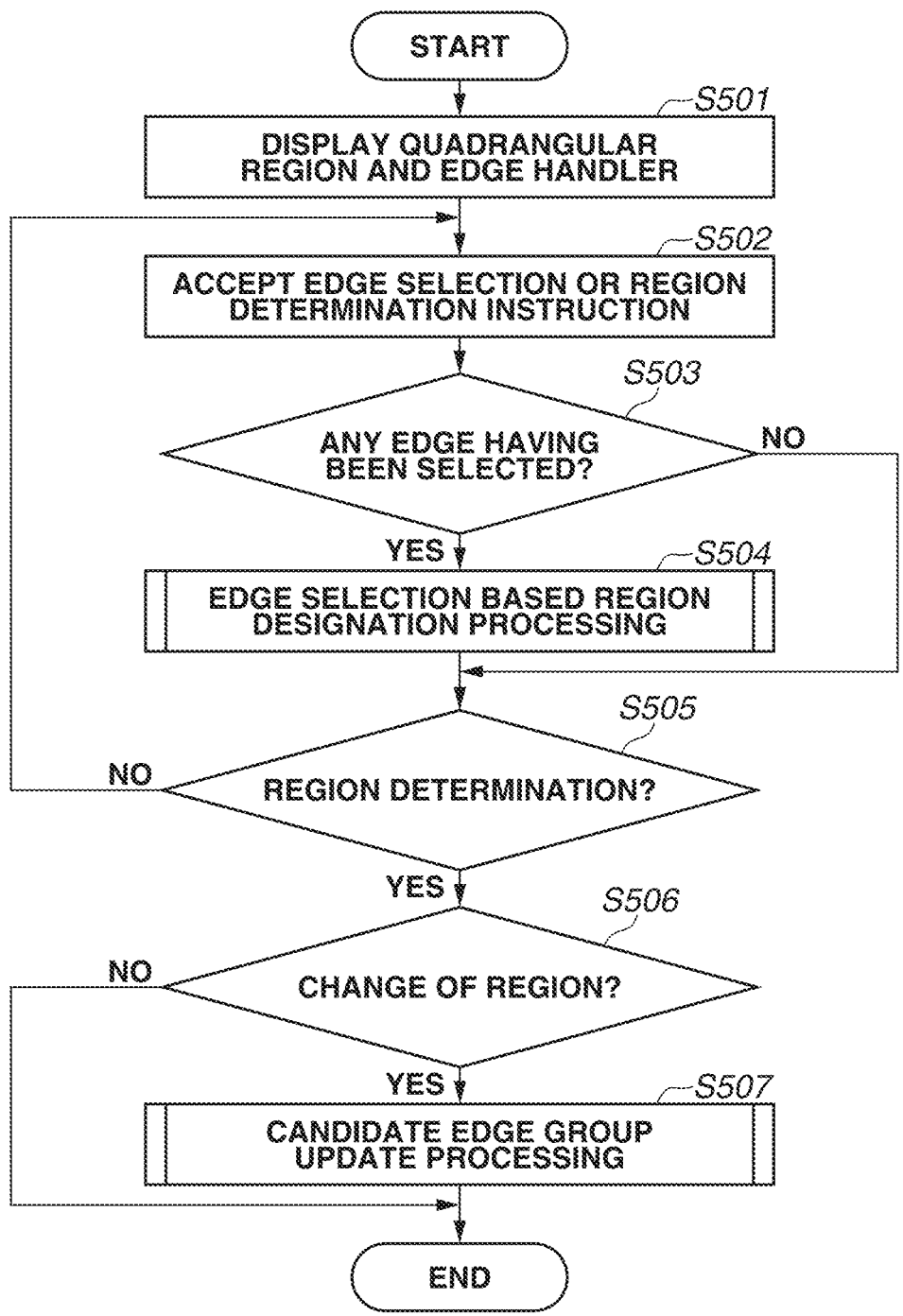
FIG. 5 is a flowchart illustrating a region designation processing procedure according to the first exemplary embodiment.

In the present exemplary embodiment, the CPU 201 (i.e., the computer) of the portable terminal 101 is functionally operable as a processing unit that performs processing in each step of FIG. 5 by executing a related processing program loaded into the RAM 202 from the ROM 203.

In step S501, the CPU 201 superimposes the quadrilateral region identified by the original document region identification processing performed in step S302 together with edge handles, each of which accepts a user operation, on the input image displayed by the display unit 207. A display pattern of the handles will be described in detail below with reference to FIGS. 7A to 7D.

In step S502, the CPU 201 accepts an edge selection instruction or a region determination instruction from the user via the operation unit 208. When the user selects an edge handle displayed by the display unit 207, it is regarded that selecting one edge of the quadrilateral has been instructed (or the edge selection has been instructed).

In step S503, the CPU 201 determines whether the edge selection has been instructed in step S502. Namely, the CPU 201 determines whether one edge of the quadrilateral has been selected based on the user instruction.

In step S504, the CPU 201 performs edge selection based region designation processing. The edge selection based region designation processing will be described in detail below with reference to FIG. 6 and FIGS. 7A to 7D.

In step S505, the CPU 201 determines whether the region determination has been instructed in step S502. If the region determination has been instructed (YES in step S505), the CPU 201 holds the quadrilateral region of the time point. Then, the operation proceeds to step S506. If the region determination has not been instructed (NO in step S505), the operation returns to step S502 to accept a user instruction again.

In step S506, the CPU 201 determines whether the edge selection and the region change have been performed through the processing in steps S502, S503, and S504. If the CPU 201 determines that the region change has been performed (YES in step S506), the operation proceeds to step S507. If it is determined that the region change has not been performed (NO in step S506), the CPU 201 holds the quadrilateral region of the time point and terminates the processing of the flowchart illustrated in FIG. 5.

In step S507, the CPU 201 performs candidate edge group update processing for updating each evaluation value of a candidate edge group for other input image with reference to information about the region determined in step S505. The candidate edge group update processing will be described in detail below with reference to FIG. 10.

Through the processing flow illustrated in FIG. 5, if the positions of respective edges constituting a quadrilateral region (i.e., an original document region) detected from one image (i.e., the reference image) of a plurality of images have been changed and the shape of the quadrilateral region has been corrected, it is feasible to update the evaluation values of a candidate edge group to be used when a quadrilateral image included in other image is detected.

<Detailed Description of Candidate Edge Group Update Processing (to be Performed in Step S507)>

In the candidate edge group update processing to be performed in step S507, if the shape of the quadrilateral region is corrected in response to a user instruction in the edge selection, the evaluation values of a candidate edge group for an image other than the corrected reference image are reevaluated and the evaluation values of the candidate edge group are updated.

The candidate edge group update processing will be described in detail below with reference to a flowchart illustrated in FIG. 10.

In the present exemplary embodiment, the CPU 201 (i.e., the computer) of the portable terminal 101 is functionally operable as a processing unit that performs processing in each step of FIG. 10 by executing a related processing program loaded into the RAM 202 from the ROM 203.

In step S1001, the CPU 201 acquires edge data of the quadrilateral region corrected in step S504. For example, in the candidate line segment group management table illustrated in FIG. 9A, the data acquired by the CPU 201 includes upper edge data that is 2nd-ranked edge data selected from the candidate edge group and right edge data that is 3rd-ranked edge data selected from the candidate edge group, together with left edge data and lower edge data that are not corrected.

In step S1002, the CPU 201 determines whether the edge data acquired in step S1001 represents an edge existing in the candidate edge group. The CPU 201 performs the determination processing of step S1002 for each of four edges.

If it is determined that the selected edge exists in the candidate edge group (YES in step S1002), then in step S1003, the CPU 201 changes the evaluation value of the selected edge in such a manner that the evaluation value is ranked first in the candidate edge group.

The above-mentioned evaluation value can be a value evaluated based on geometrical information (e.g., length ratio of opposite edges, interior angles, and aspect ratio) described in the processing of step S302 or can be a value obtained from comparison of tint or dispersion between interior and exterior portions about line segments that constitute the quadrilateral. The CPU 201 changes and determines the evaluation value by performing weighting or the like in such a manner that the evaluation value of a selected edge becomes higher than that of other edges.

In step S1004, the CPU 201 acquires reevaluation values by performing reevaluation processing on the candidate edge group with reference to the evaluation value determined in step S1003.

In step S1005, the CPU 201 performs candidate edge group update processing based on the reevaluation values acquired in step S1004. The candidate edge group update processing includes changing the rank of each candidate line segment in the candidate line segment group management table illustrated in FIG. 9A.

In step S1006, the CPU 201 determines whether the update of the candidate edge group has been completed for all input images other than the reference image having been subjected to the edge correction processing. If it is determined that the update of the candidate edge group has been completed for all input images other than the image having been subjected to the edge correction processing (YES in step S1006), the CPU 201 terminates the processing of the flowchart illustrated in FIG. 10.

FIG. 9B illustrates a candidate line segment group management table, which is obtained when the candidate line segment groups illustrated in FIG. 9A have been updated in step S1005. The contents of the candidate line segment groups illustrated in FIG. 9B are similar to those illustrated in FIG. 9A except for the ranking of respective groups. The first rank of FIG. 9B is an updated result of the third rank of FIG. 9A. The second rank of FIG. 9B is not different from the second rank of FIG. 9A. Further, the third rank of FIG. 9B is an updated result of the first rank of FIG. 9A. The fourth rank of FIG. 9B is an updated result of the sixth rank of FIG. 9A. The fifth rank of FIG. 9B is not different from the fifth rank of FIG. 9A. The sixth rank of FIG. 9B is an updated result of the fourth rank of FIG. 9A.

Through the processing flow illustrated in FIG. 10, if the shape of a quadrilateral region (i.e., an original document image) included in the reference image is corrected, it is feasible to reevaluate evaluation values of a candidate edge group for a quadrilateral region included in an image other than the reference image and update the evaluation values of the candidate edge group.

Therefore, when an original document image is detected from an image other than the reference image, it is feasible to reflect the results of the correction applied to an original document image included in one image.

<Detailed Description of Edge Selection Based Region Designation Processing (to be Performed in Step S504)>

In the edge selection based region designation processing to be performed in step S504, deformation of a quadrilateral region is performed in response to a user instruction when an edge is selected.

Figure 7A:
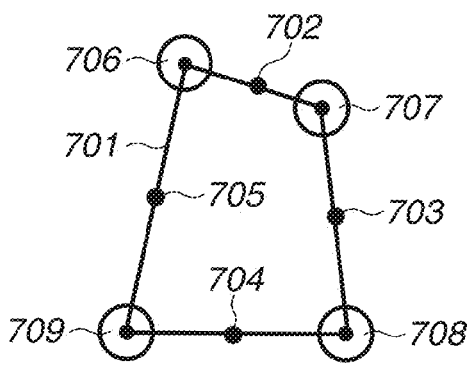
FIGS. 7A, 7B, 7C, and 7D are diagrams conceptually illustrating the edge selection based region designation processing according to the first exemplary embodiment.

FIGS. 7A to 7D conceptually illustrate the edge selection based region designation processing. FIG. 7A illustrates a quadrilateral region 701, edge handles 702, 703, 704, and 705 each being used for edge selection, and vertex handles 706, 707, 708, and 709 each being used for vertex selection.

In the present exemplary embodiment, the edge handles 702, 703, 704, and 705 are circular handles disposed at midpoints of respective edges. Each edge handle is not limited to the illustrated example in shape and position. For example, the edge itself can be configured to be selectable as a handle.

Figure 6:
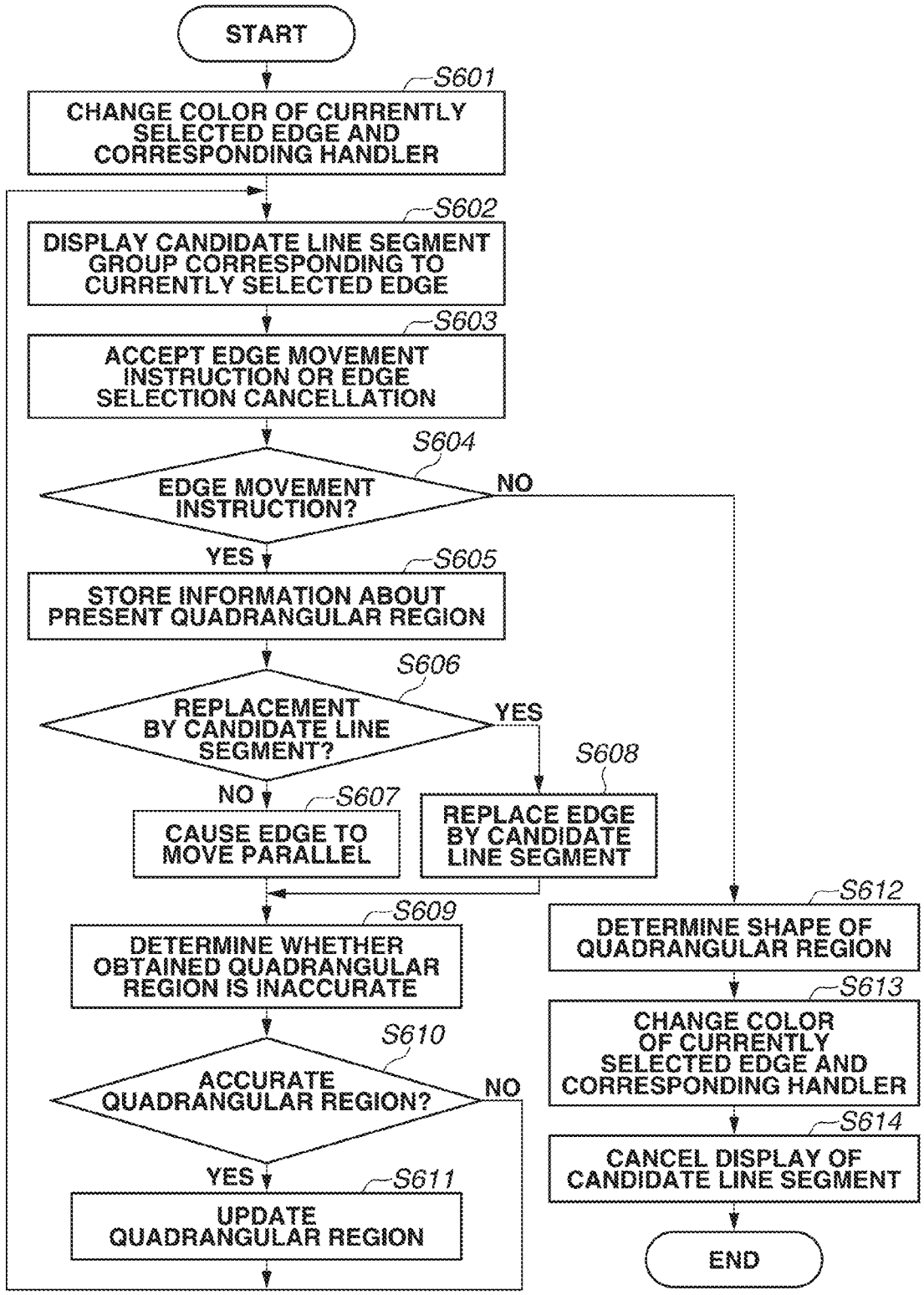
FIG. 6 is a flowchart illustrating an edge selection based region designation processing procedure according to the first exemplary embodiment.

FIG. 6 is a flowchart illustrating the edge selection based region designation processing.

The region designation processing based on selection of an edge with the handle will be described in detail below with reference to the flowchart illustrated in FIG. 6 and the diagrams of FIGS. 7A to 7D.

In the present exemplary embodiment, the CPU 201 (i.e., the computer) of the portable terminal 101 is functionally operable as a processing unit that can perform processing in each step of FIG. 6 by executing a related processing program loaded into the RAM 202 from the ROM 203.

Figure 7B:
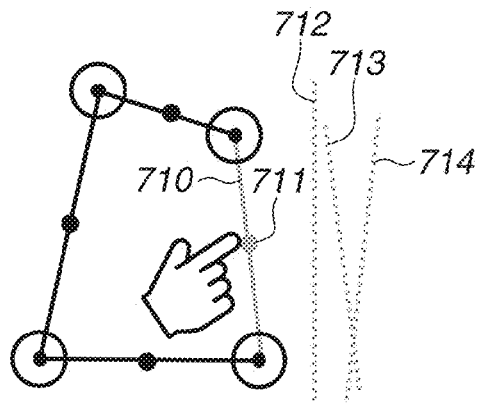

In step S601, if a user touches (selects) an edge handle (or an edge itself) on the display screen, the CPU 201 changes the display pattern (e.g., color) of the currently selected edge and the corresponding handle so that the selected edge and the corresponding handle can be differentiated from another edges and their handles. Therefore, the user can surely confirm the currently selected edge. FIG. 7B illustrates a state where an edge handle 711 of an edge 710 has been selected and colors of the edge 710 and the edge handle 711 have been changed.

In step S602, the CPU 201 displays a candidate edge group corresponding to the currently selected edge. The candidate edge group corresponding to the currently selected edge can be obtained by extracting only the candidate line segments, by which the currently selected edge can be replaced, from the candidate line segment group detected in the original document region identification processing. Therefore, the user can easily confirm whether a desired line segment, by which the currently selected edge can be replaced, is included in the candidate edge group. Further, displaying a candidate edge group corresponding to the selected edge only when an edge is selected is useful to maintain the visibility of the display screen in a state where no edge is selected. Geometrical information (e.g., length, angle, and position) about the currently selected edge can be referred to in a method for extracting only the candidate edge group corresponding to the currently selected edge from a plurality of candidate line segment groups. FIG. 7B illustrates a candidate edge group of line segments 712, 713, and 714 displayed when the edge 710 has been selected. The displayed candidate edge group of line segments 712, 713, and 714 is differentiated in color or display pattern (e.g., dotted line) so that the candidate edge group can by discriminated from the quadrilateral region 701 and the currently selected edge 710.

In step S603, the CPU 201 accepts an edge movement instruction or an edge selection cancellation from the user. In this case, the user issues the edge movement instruction by changing the position of an edge handle. For example, when the user slides a finger on the display screen while continuously touching the position of an edge with the finger, the CPU 201 determines that the position of the edge handle has been changed and the edge movement instruction has been provided. Further, the user issues the edge selection cancellation by cancelling the selection of the edge handle. For example, if the user releases the finger touching the position of the edge from the display screen, the CPU 201 determines that the selection has been cancelled.

In step S604, the CPU 201 determines whether the user instruction accepted in step S603 is the edge movement instruction. If it is determined that the accepted instruction is the edge movement instruction (YES in step S604), the operation proceeds to step S605. Then, in step S605, the CPU 201 temporarily stores information about the quadrilateral region to which the deformation is not yet subjected in the memory.

Next, in step S606, the CPU 201 determines whether to move the currently selected edge to the position of a candidate line segment positioned closest to the present position of the currently moving edge handle. Namely, the CPU 201 determines whether to change the position of the currently selected edge.

In FIG. 7B, a determination target is the line segment 712 positioned closest to the edge handle 711. The CPU 201 determines whether to replace the currently selected edge by the closest candidate line segment with reference to geometrical information, such as the distance between the movement position (movement instructed position) of the currently selected edge handle and the determination target candidate line segment or the difference in length or angle between the currently selected edge and the determination target candidate line segment. For example, in the state where the movement instruction has been received, if it is determined that the distance between the handle position and the determination target line segment is equal to or less that a predetermined threshold, the CPU 201 determines that the instruction to move the currently selected edge to the position of the determination target line segment (namely, replace the currently selected edge by the determination target line segment) has been received.

If it is determined that the currently selected edge should not be replaced by the candidate line segment (NO in step S606), then in step S607, the CPU 201 causes the currently selected edge to move parallel toward the position instructed by the user in step S603.

Figure 7C:
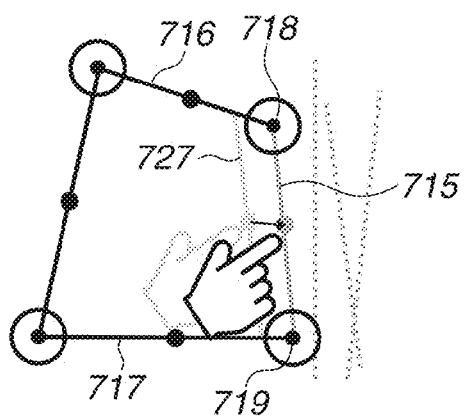

FIG. 7C illustrates a parallel movement of the selected edge from the line segment 727 to a line segment 715. More specifically, the CPU 201 causes two edges 716 and 717, each neighboring the currently selected edge 727, to move in accordance with the movement of the edge handle, while holding the gradient of the edge 727. A deformed quadrilateral region obtainable through the above-mentioned parallel movement of the currently selected edge 727 has new vertices, one of which is an intersecting point 718 between a straight line extending from the edge 716 and the moved edge and the other is an intersecting point 719 between a straight line extending from the edge 717 and the moved edge.

If it is determined that the currently selected edge should be replaced by the candidate line segment (YES in step S606), then in step S608, the CPU 201 moves and displays the currently selected edge in such a manner that the position of the currently selected edge coincides with the position of the determination target candidate line segment. In this case, the user is required to perform a simple operation to move the currently selected edge toward the displayed candidate line segment whereby the currently selected edge can be placed on the closely located candidate line segment if the distance between the currently selected edge and the candidate line segment is equal to or less than the predetermined threshold. Accordingly, if the candidate edge group includes a line segment representing a corresponding edge of an original document region, an accurate edge of the original document region can be easily designated.

Figure 7D:
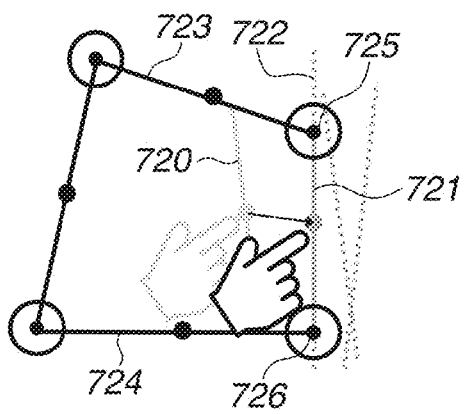

FIG. 7D illustrates a replacement of an edge 720 with an edge 721. More specifically, when the user causes the edge 720 to move toward a candidate edge 722, the edge 720 is replaced by the candidate edge 722 in both position and gradient at the time when the distance between the edge 720 and the candidate edge 722 becomes equal to or less than the predetermined threshold. The newly obtained edge 721 has upper and lower ends at which the line segment 722 intersects with two edges 723 and 724 neighboring the selected edge 720.

In step S609, the CPU 201 determines whether the quadrilateral region obtained in step S607 or S608 is inaccurate with reference to distances between vertices, positions of respective vertices, and interior angles of the deformed quadrilateral region. For example, in the above-mentioned determination, the CPU 201 refers to the distance between vertices that is determined by setting a minimum size of an original document region included in the captured image. Further, it is useful to determine whether the distance between vertices is appropriate to assure operability and visibility with reference to the display size of respective vertex handles. Further, it is useful to determine whether all the vertices are present in an image display region with reference to vertex positions. Further, it is useful to determine whether a quadrilateral is obtainable when an original document is photographed in an oblique direction with reference to interior angles.

In step S610, the CPU 201 performs determination based on the determination result in step S609. If it is determined that the obtained quadrilateral region is inaccurate (NO in step S609), the CPU 201 does not replace the present quadrilateral region by the quadrilateral region obtained in step S607 or step S608. In other words, the CPU 201 does not accept the deformation instruction from the user.

On the other hand, if the CPU 201 determines that the obtained quadrilateral region is accurate (YES in step S610), the operation proceeds to step S611. Then, in step S611, the CPU 201 replaces the present quadrilateral region by the quadrilateral region obtained in step S607 or step S608. Namely, the CPU 201 accepts the deformation instruction from the user.

In step S612, namely, if the edge selection cancellation is instructed by the user in step S603 and the accepted instruction is not the edge movement instruction (NO in step S604), the CPU 201 determines the shape of the quadrilateral region. The quadrilateral region shape determination is, for example, determining whether the quadrilateral region has a convex shape with reference to interior angles thereof or determining whether the opposite edges are intersectional.

In step S613, the CPU 201 returns the display pattern (color) of the currently selected edge and the corresponding handle to the previous pattern. Therefore, the user can confirm that the selection of the edge has been cancelled.

In step S614, the CPU 201 cancels the display of the candidate line segment. Therefore, only the quadrilateral region and the handles remain as superimposed items on the input image of the display screen, as illustrated in FIG. 7A, when the user has cancelled the selection of the edge. Accordingly, the user can confirm the quadrilateral region with visibility adequately maintained.

<Detailed Description of Distortion Correction Processing (to be Performed in Step S304)>

Figure 8A:
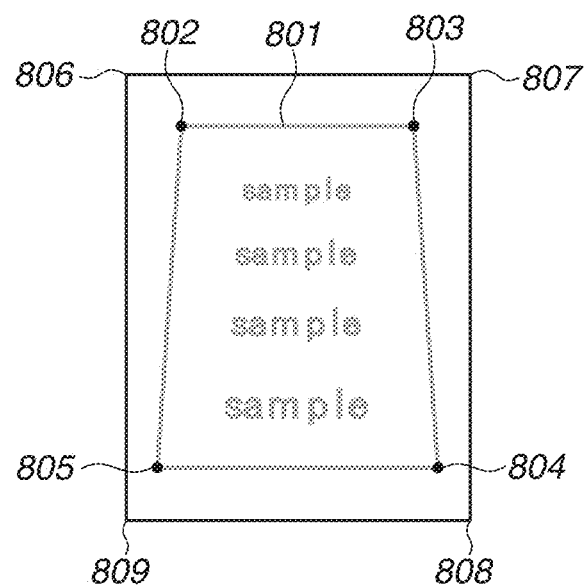
FIGS. 8A and 8B are diagrams illustrating distortion correction processing according to the first exemplary embodiment.

The distortion correction processing to be performed in step S304 is performed by the image processing unit 209. The image processing unit 209 performs the distortion correction processing with reference to the quadrilateral region that has been obtained from the input image including the original document image through the original document region identification processing and the region designation processing. FIG. 8A illustrates the quadrilateral region superimposed on the input image. A quadrilateral region 801 is supposed to be a quadrilateral region that has been obtained through the region designation processing. The image processing unit 209 calculates a scaling parameter based on the size of the original document region included in the captured image. The scaling parameter calculated in this case is a scaling parameter suitable for output image size (i.e., image size applied when the quadrilateral region included in the captured image is output as file data). For example, it is useful to perform scaling in such a way as to output an image having A4 or letter size. The scaling parameter can be set beforehand or can be selected later by the user.

Figure 8B:
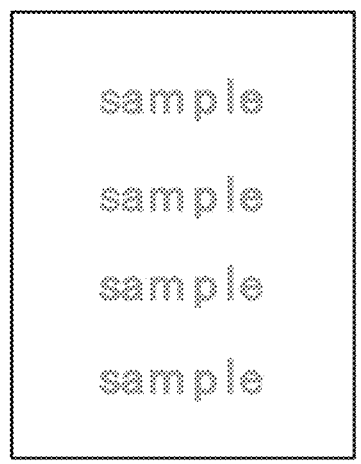

Assuming that the shape of a quadrilateral region is generally trapezoidal, a projective transformation matrix is employed as the above-mentioned scaling parameter. The projective transformation matrix can be calculated using a conventionally known method with reference to vertex information (vertices 802, 803, 804, and 805) defining the quadrilateral region included in the input image and coordinate information about four corners (806, 807, 808, and 809) defining the output image. In a case where the processing speed is prioritized, an affine transformation matrix or a simple scaling rate can be employed as the scaling parameter. If the scaling parameter is once determined, the image processing unit 209 can extract the quadrilateral region from the input image by applying the scaling processing on only the quadrilateral region of the input image. The extracted image can be output to the touch panel display device 102. FIG. 8B illustrates an output image obtained through the distortion correction processing.

As described above, according to the present exemplary embodiment, in a case where a plurality of images is input, it is feasible to correct detection results of a quadrilateral region included in an image other than the reference image by correcting the positions of four edges that constitute a quadrilateral region (i.e., an original document image) included in the reference image (i.e., one of the input images) and correcting the shape of the quadrilateral region. Therefore, the processing load for correcting four edges of each original document image included in other input images can be reduced. As a result, the user operation can be simplified.

Further, displaying a candidate edge group of an edge only when a user selects the edge in the region designation processing is useful, because it is easy for the user to confirm whether the obtained candidate is desired. Therefore, the screen display during the processing can be simplified.

Further, it is feasible to select an edge from the candidate edge group based on the position of a handle operated to select the edge. Therefore, compared to a case where the vertex position is manually designated, designation of the quadrilateral region is easy and efficient.

In the first exemplary embodiment, the image processing apparatus performs the original document region identification processing, the region designation processing, and the distortion correction processing after a user adds image data (performs a continuous photographing operation or inputs a plurality of images).

In a second exemplary embodiment, a user additionally inputs images (or additionally perform a photographing operation) after the image processing apparatus has completed the original document region identification processing, the region designation processing, and the distortion correction processing on an original document image (i.e., a quadrilateral region) included in a processing target reference image when the reference image has been input by the user. Further, the image processing apparatus can change evaluation results of a candidate line segment group with respect to four edges of an original document included in a later added image and can update the ranking of respective edge candidates.

Therefore, it is feasible to reflect the content of the correction processing applied to the reference image (i.e., an image having been input by a user as a processing target) to an original document image included in another image having been input after the correction has been applied to the positions of respective edges constituting a quadrilateral region of an original document image (quadrilateral region) included in the reference image.

In the second exemplary embodiment, only the features different from those described in the first exemplary embodiment are described in detail.

FIG. 11 is a flowchart illustrating the distortion correction processing (which may be referred to as "trapezoidal correction processing") that is performed by the portable terminal 101 according to the present exemplary embodiment. The flowchart illustrated in FIG. 11 includes processing similar to that described with reference to FIG. 3. Therefore, redundant description thereof will be avoided.

In the present exemplary embodiment, the CPU 201 (i.e., the computer) of the portable terminal 101 is functionally operable as a processing unit that can perform processing in each step of FIG. 11 by executing a related processing program loaded into the RAM 202 from the ROM 203.

In step S1102, the CPU 201 determines whether there is any image to be added. If it is determined that there is an image addition instruction (YES in step S1102), the operation proceeds to step S301. If it is determined that there is not any image to be added (NO in step S1102), the CPU 201 terminates the processing of the flowchart illustrated in FIG. 11.

<Detailed Description of Region Designation Processing (to be Performed in Step S1101)>

Figure 12:
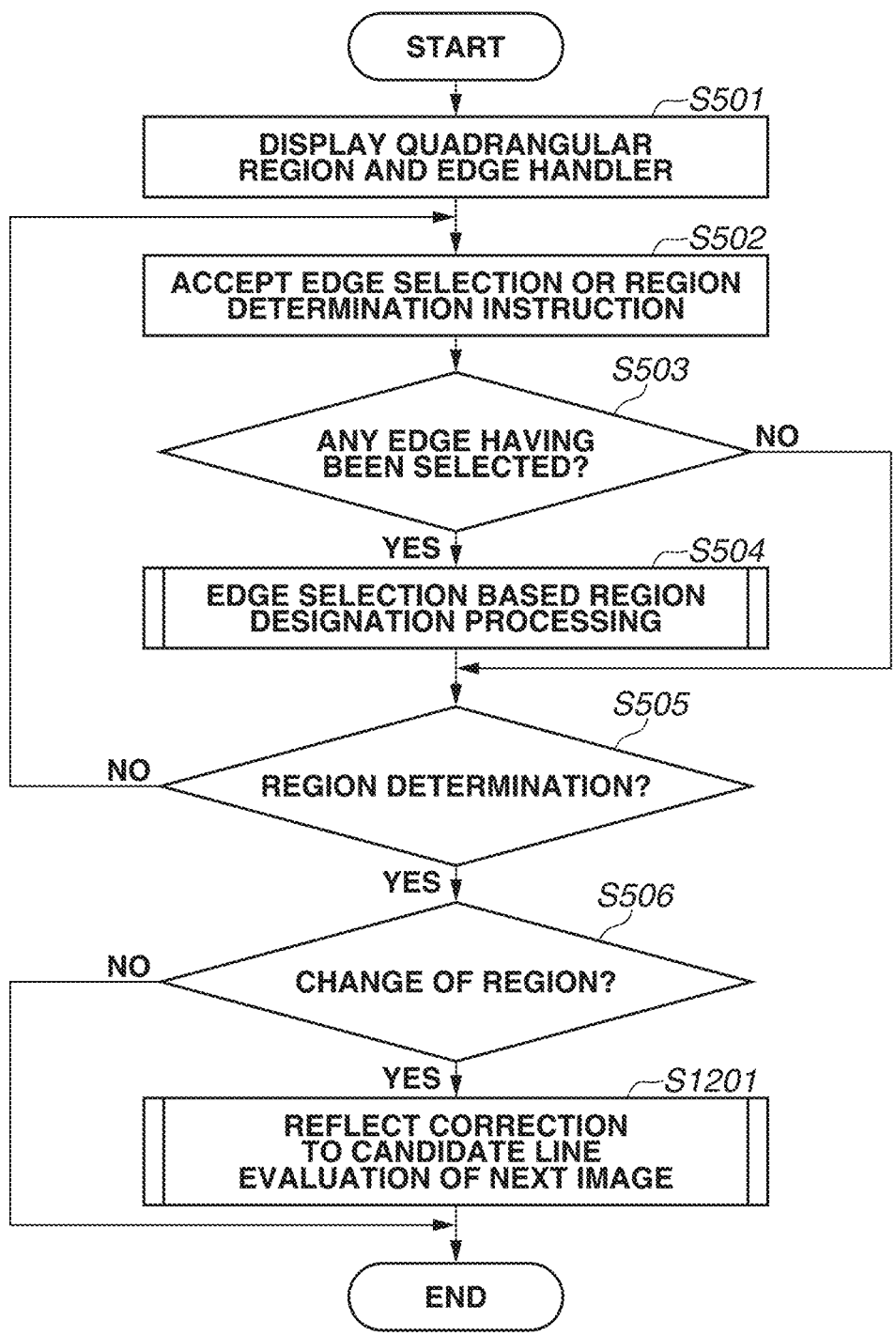
FIG. 12 is a flowchart illustrating a region designation processing procedure according to the second exemplary embodiment.

FIG. 12 is a flowchart illustrating candidate line segment group update processing according to the present exemplary embodiment. The flowchart illustrated in FIG. 12 includes processing similar to that described with reference to FIG. 5. Therefore, redundant description thereof will be avoided.

In the present exemplary embodiment, the CPU 201 (i.e., the computer) of the portable terminal 101 is functionally operable as a processing unit that can perform processing in each step of FIG. 12 by executing a related processing program loaded into the RAM 202 from the ROM 203.

In step S1201, the CPU 201 performs processing for reflecting the correction results to evaluation of a candidate line segment group of the next input image to be added. The rank of each candidate edge group in the input image can be updated through the reflection processing.

Accordingly, it is feasible to correct the positions of respective edges constituting a quadrilateral region according to a user instruction and reflect processing results to the next input image.

Therefore, it is feasible to reflect the content of the correction processing applied to the input reference image to an original document image included in another image having been input after the correction has been applied to the positions of respective edges constituting a quadrilateral region of an original document image included in the reference image.

Therefore, it is feasible to reflect the content of the correction processing applied to an original document image included in the reference image to an image added after the processing for correcting the original document image included in the reference image has been completed.

In a third exemplary embodiment, the image processing apparatus acquires information about an edge of a quadrilateral region that has been subjected to the correction from a user and enables, only for the corrected edge, to update the evaluation of a candidate line segment group of an original document image included in another image. Therefore, the quadrilateral region corrected by the user can be identified accurately. The processing load to evaluate the candidate line segment group to be corrected can be reduced. The processing can be completed speedily.

<Detailed Description of Region Designation Processing (to be Performed in Step S1101)>

Figure 13:
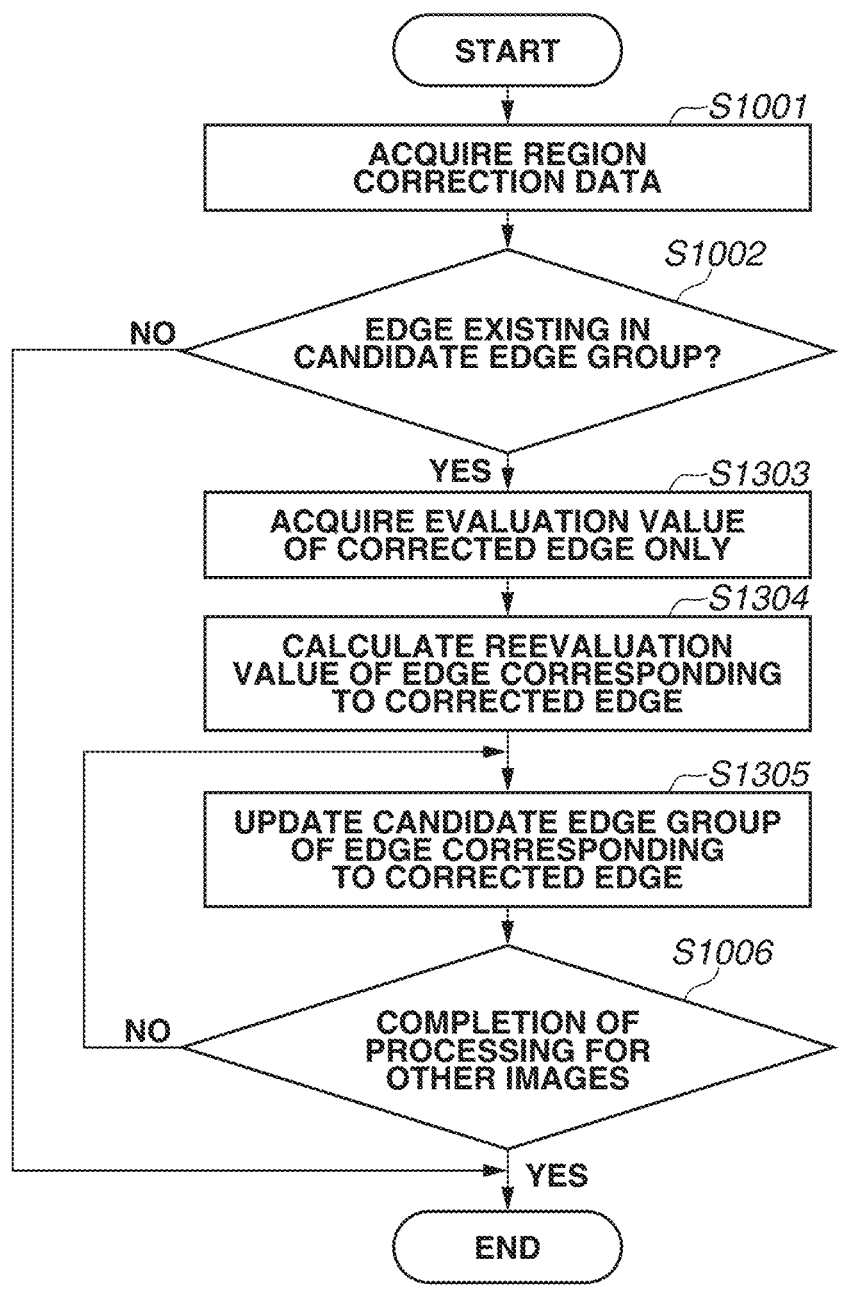
FIG. 13 is a flowchart illustrating a region designation processing procedure according to a third exemplary embodiment.

FIG. 13 is a flowchart illustrating candidate edge group update processing according to the third exemplary embodiment.

In the present exemplary embodiment, the CPU 201 (i.e., the computer) of the portable terminal 101 is functionally operable as a processing unit that can perform processing in each step of FIG. 13 by executing a related processing program loaded into the RAM 202 from the ROM 203.

The flowchart illustrated in FIG. 13 includes processing similar to that described with reference to FIG. 10. Therefore, redundant description thereof will be avoided.

If it is determined that the selected edge exists in the candidate edge group (YES in step S1002), then in step S1303, the CPU 201 acquires the place of the selected edge and an evaluation value of the first-ranked candidate edge group. In the present exemplary embodiment, the place of the selected edge indicates one of four edges, i.e., the upper edge, the right edge, the lower edge, or the left edge. Further, the evaluation value can be acquired with reference to the geometrical information (e.g., length ratio of opposite edges, interior angles, and aspect ratio), as described in step S302. Further, image information (e.g., differences in tint or dispersion between interior and exterior portions) can be referred to in identifying the line segments that constitute a quadrilateral.

In step S1304, the CPU 201 performs processing for reevaluating a candidate edge group of the corresponding edge place with reference to the evaluation value of an edge corresponding to the edge place acquired in step S1303.

In step S1305, the CPU 201 performs update processing on only the candidate edge group corresponding to the edge place corrected based on the evaluation value calculated in step S1304.

Therefore, the quadrilateral region corrected by the user, of four edges of an original document, can be identified accurately. The processing load to evaluate a candidate line segment group to be corrected for an original document image included in another image can be reduced. Therefore, the original document region identification processing and the region designation processing for an original document image included in another image can be completed speedily.

In a fourth exemplary embodiment, when the image processing apparatus updates the evaluation of a candidate line segment group for another image with respect to the position of an edge constituting a quadrilateral region corrected by a user, the image processing apparatus determines whether to apply the updated content for each image before performing the candidate line segment group update processing. Therefore, it is feasible to determine whether to update the evaluation of a candidate line segment group based on a comparison between an image having an edge constituting a quadrilateral region corrected by a user and another image. As a result, the user operation can be simplified.

<Detailed Description of Region Designation Processing (to be Performed in Step S1101)>

Figure 14:
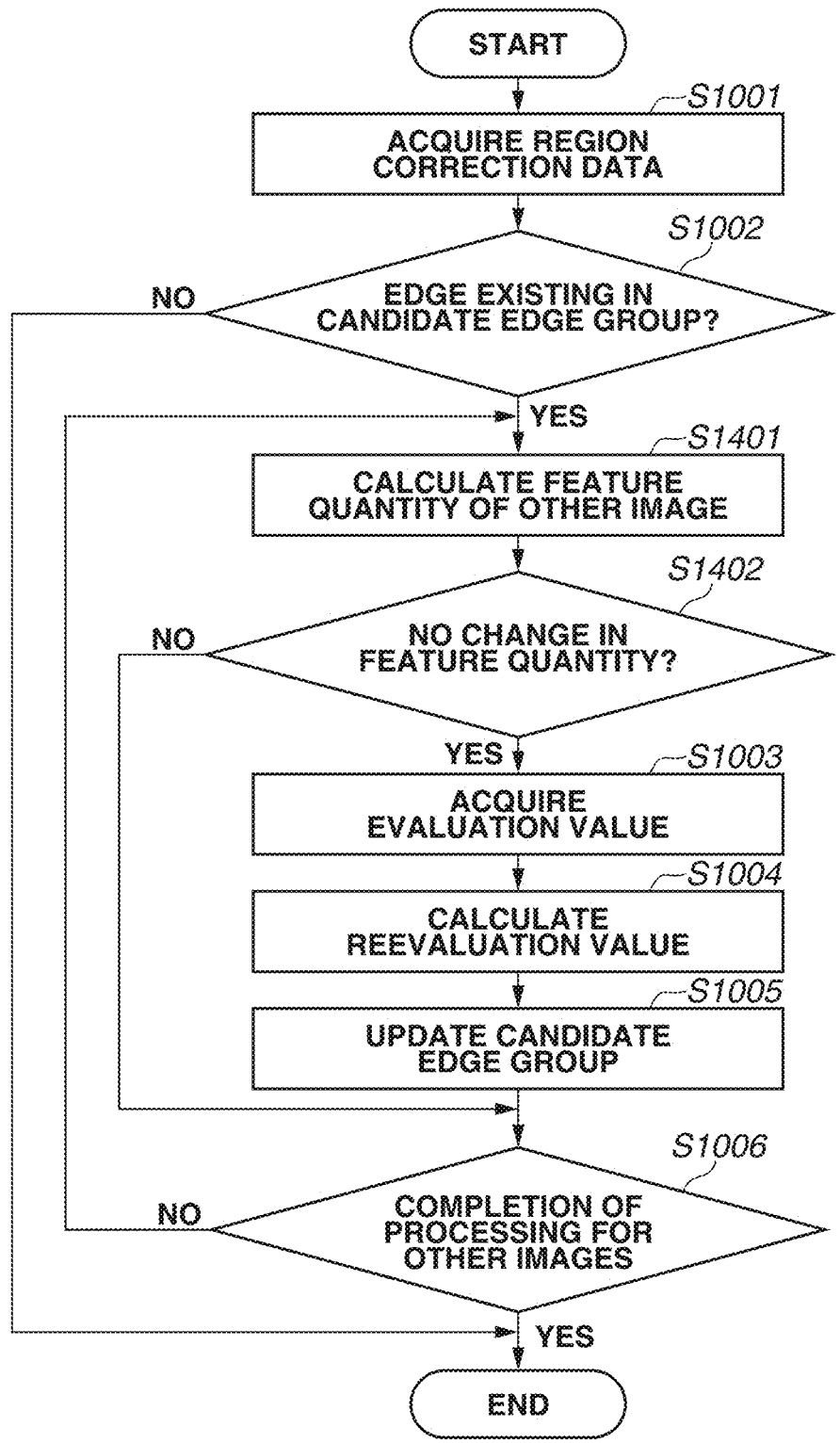
FIG. 14 is a flowchart illustrating a region designation processing procedure according to a fourth exemplary embodiment.

FIG. 14 is a flowchart illustrating candidate edge group update processing according to the fourth exemplary embodiment.

In the present exemplary embodiment, the CPU 201 (i.e., the computer) of the portable terminal 101 is functionally operable as a processing unit that can perform processing in each step of FIG. 14 by executing a related processing program loaded into the RAM 202 from the ROM 203.

The flowchart illustrated in FIG. 14 includes processing similar to that described with reference to FIG. 10. Therefore, redundant description thereof will be avoided.

In step S1401, the CPU 201 acquires information about feature quantity of another image input through a continuous photographing operation. The feature quantity is, for example, information about luminance value of the entire image, color histogram, or luminance difference between the original document and the background, which is referred to in identifying differences between the feature quantity of an input image and the feature quantity of the reference image. Any other information is usable in the above-mentioned determination relating to the feature quantity. Further, the reference image is an image that constitutes a part of an input image and includes an original document image having an edge, constituting a quadrilateral region, the position of which has been initially corrected by a user.

In step S1402, the CPU 201 determines whether there is any change in feature quantity between the input image and the reference image with reference to the information acquired in step S1401. For example, the determination in step S1402 can be performed by checking whether the differences between the acquired information and the reference image is equal to or less than a threshold value determined beforehand. The threshold value can be designated or set externally.

Therefore, it is feasible to determine whether to update the evaluation of a candidate line segment group based on a comparison between an image including an original document image having an edge constituting a quadrilateral region corrected by a user and another image. As a result, the user operation can be simplified.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors and one or more memories (e.g., central processing unit (CPU), micro processing unit (MPU)), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2015-144409, filed Jul. 21, 2015, which is hereby incorporated by reference herein in its entirety.

What is claimed is:

1. An image processing apparatus comprising:
a controller including a memory storing instructions and a processor executing the instructions, the controller being configured to function as:
an acquisition unit configured to acquire a plurality of images;
a first detection unit configured to detect a quadrilateral region from a first image which is one of the plurality of images acquired by the acquisition unit;
a determination unit configured to determine a position of each edge that constitutes the quadrilateral region detected by the first detection unit; and
a second detection unit configured to detect a quadrilateral region included in each of the plurality of images which is different from the first image acquired by the acquisition unit using information about the position of each edge which has been determined by the determination unit.

2. The image processing apparatus according to claim 1, further comprising:
a correction unit configured to perform distortion correction processing on the quadrilateral region, which is included in the first image and is detected by the first detection unit, and of which each edge position has been determined by the determination unit, and another detected quadrilateral region, which is included in each of the plurality of images which is different from the first image and is detected by the second detection unit.

3. The image processing apparatus according to claim 1, wherein if the position of each edge is determined by the determination unit, a shape of the detected quadrilateral region is modified.

4. The image processing apparatus according to claim 1, wherein the first detection unit detects a plurality of line segments as candidates of each edge constituting the quadrilateral region, and detects the quadrilateral region based on respective evaluation values of the detected plurality of line segments.

5. The image processing apparatus according to claim 4, wherein if the position of each edge is determined by the determination unit, the evaluation values of the plurality of candidate line segments are updated based on a determination.

6. The image processing apparatus according to claim 1, wherein the second detection unit detects the quadrilateral region using the information about the position of each edge determined by the determination unit only for an edge corresponding to the edge of which the position has been determined by the determination unit.

7. The image processing apparatus according to claim 1, wherein the second detection unit detects the quadrilateral region using the information about the position of each edge determined by the determination unit only for an image that is similar to the first image in feature quantity and is included in the plurality of images acquired by the acquisition unit.

8. The image processing apparatus according to claim 1, wherein the acquired plurality of images is obtained by image capturing of a document performed by an imaging unit.

9. The image processing apparatus according to claim 1, wherein the quadrilateral region is an image of a document captured by an imaging unit.

10. An image processing apparatus comprising:
a controller including a memory storing instructions and a processor executing the instructions, the controller being configured to function as:
an acquisition unit configured to acquire a plurality of images including a first image and a second image which is different from the first image;
a detection unit configured to detect a quadrilateral region from the first image included in the plurality of images acquired by the acquisition unit;
a determination unit configured to determine a position of each edge that constitutes the quadrilateral region detected by the detection unit; and
a correction unit configured to correct the first image and the second image based on information about the quadrilateral region having an edge of which position has been determined by the determination unit.

11. An image processing method for controlling an image processing apparatus that comprises a controller including a memory storing instructions and a processor executing the instructions to execute the method, the image processing method comprising:
acquiring a plurality of images;
detecting a quadrilateral region from a first image which is one of the acquired plurality of images;
determining a position of each edge that constitutes the detected quadrilateral region; and
detecting a quadrilateral region included in each of the plurality of images which is different from the first image acquired using information about the position of each edge determined.

12. The image processing method according to claim 11, further comprising:
performing distortion correction processing on the detected quadrilateral region, which is included in the first image, and of which each edge position is determined, and another detected quadrilateral region, which is included in each of the plurality of images which is different from the first image and is detected.

13. The image processing method according to claim 11, wherein if the position of each edge is determined, a shape of the detected quadrilateral region is modified.

14. The image processing method according to claim 11, wherein the detecting includes detecting a plurality of line segments as candidates of each edge constituting the quadrilateral region, and detecting the quadrilateral region based on respective evaluation values of the detected plurality of line segments.

15. The image processing method according to claim 14, wherein if the position of each edge is determined, the evaluation values of the plurality of candidate line segments are updated based on a determination.

16. The image processing method according to claim 11, wherein information about the position of each determined edge is used only for an edge corresponding to the edge of which the position has been determined.

17. The image processing method according to claim 11, wherein information about the position of each determined edge is used only for an image that is similar to the first image in feature quantity and included in the acquired plurality of images.

18. The image processing method according to claim 11, wherein the acquired plurality of images is obtained by image capturing of a document performed by an imaging unit.

19. The image processing method according to claim 11, wherein the quadrilateral region is an image of the document captured by an imaging unit.

20. An image processing method for controlling an image processing apparatus that comprises a controller including a memory storing instructions and a processor executing the instructions to execute the method, the image processing method comprising:
  acquiring a plurality of images including a first image and a second image which is different from the first image;
  detecting a quadrilateral region from the first image included in the acquired plurality of images;
  determining a position of each edge that constitutes the detected quadrilateral region; and
  correcting the first image and the second image based on information about the quadrilateral region having an edge of which position has been determined.

21. A non-transitory computer-readable storage medium storing computer executable instructions that cause a computer to execute a control method, the control method comprising:
  acquiring a plurality of images;
  detecting a quadrilateral region from a first image which is one of the acquired plurality of images;
  determining a position of each edge that constitutes the detected quadrilateral region; and
  detecting a quadrilateral region included in each of the plurality of images which is different form the first image acquired using information about the position of each edge determined.

* * * * *